Patented Mar. 25, 1930

1,752,176

UNITED STATES PATENT OFFICE

KENZO HATTORI, OF SAITAMA-KEN, JAPAN

METHOD OF PREPARING EMULSIONS

No Drawing.    Application filed March 31, 1926.   Serial No. 98,924.

This invention relates to a method of preparing emulsions, characterized by using as an emulsifier protalbic acid. The object of the invention is to facilitate the preparation of emulsions in general, increase the stability of emulsions and make their effects as medicines perfect, by using this emulsifier.

Hitherto, a number of emulsifiers, for instance, gum arabic, egg white or yolk, gelatine, soap, powdered or condensed milk, have been employed in preparing emulsions of fatty oil, volatile oil, balsam, etc. However, such emulsifiers are not quite suitable for the purpose. The perfect emulsifier should have the following characteristics:—

(1) The oil globules of emulsion must be fine and homogeneous under the miscroscope. Especially, the finest of them must show Brownian movement.

(2) The viscosity must be as low as possible, so that the emulsion produced remains homogeneous for a long time if kept still, and even if oil globules accumulate on the surface, it must easily recover the original homogenity when shaken easily.

(3) The emulsion produced must not coagulate or be destroyed by the addition of dilute acids or dilute alkalis.

(4) Must easily disperse either in cold or warm water.

(5) Must not decay or ferment when stored.

(6) Must be unaffected by heat disinfection, especially when used as injection.

(7) Emulsification must be easy in the manufacture on a large scale.

It has hitherto been very difficult to obtain such an emulsifier to fulfill all of the above conditions. For example, soap as an internal medicine is decomposed by the action of the hydrochloric acid of gastric juice and loses its emulsifying power. Again, as an injection it is apt to destroy the tissue where it is applied on account of its pecular power of destroying cells. Then, with regard to egg yolk and milk, they are so easy to decay that they are unfit for preservation. Moreover, they are deficient since they are coagulated by heat disinfection. Gelatine and gum arabic due to their weak emulsifying power, are unable to keep fat globules in fine state, and consequently such preparations are easily separable. The emulsions made from such matters are so sticky and mucous that they are quite inadequate for injection, and moreover such routine emulsifying agents are worthless for technical use. In short, the emulsifiers hitherto known may be good only for a temporary or limited use, but can never be called perfect for a general and permanent purpose.

The emulsifier used in this invention is protalbic acid.

The following are a few examples of preparing an emulsion with the emulsifiers of this invention:—

|  | Grams |
|---|---|
| Codliver oil | 1,000 |
| Protalbic acid | 2 |
| Water | 500 |

Now, according to the above prescription, add a little quantity of water to protalbic acid in a mortar to form a pasty matter. Then, mix same easily with the codliver oil which is poured into the paste little by little. When the oil poured in becomes hard to emulsify, again add a little quantity of water and mix them together. Thus, after emulsifying the whole quantity of the oil, dilute it with the remaining water.

As the above prescription shows, the quantity of the emulsifier used is only 2/1000 of that of the oil. When compared with the emulsion of codliver oil prepared according to the pharmacopœia in which the quantity of gum arabic, gum tragacanth and gelatine used reaches altogether 2/100 of that of codliver oil, the emulsifier of the present invention does in fact have an emulsifying power ten times as great. Further, if we take into consideration the easiness of emulsification and the stability of the produced emulsion, it will be recognized that it is fifty or sixty times more effective.

In the emulsion of camphor which has hitherto been considered most difficult to prepare, more than ten times as much gum arabic as camphor is used as emulsifier. However, with the emulsifier of this invention an emulsion of superior quality can be obtained easily.

The following is an example of the preparation of an acidic emulsion:—

|  | Grams |
|---|---|
| Codliver oil | 1,000 |
| Protalbic acid | 10 |
| Water | 500 |
| Lactic acid (70%) | 10 |

First mix the emulsifier together with lactic acid and a little water to form a pasty matter, and then add codliver oil thereto little by little. Again add water, mix to a pasty mass, add the cod-liver oil in small amounts and continue in this manner until all the water and oil are emulsified.

Hitherto, no one has succeeded in giving a sour taste to an oil emulsion which makes it agreeable to the palate, but according to the immediately preceding example of the present invention it is easily practicable.

Claims:

1. The method of preparing an emulsion of oil which comprises mixing with the oil protalbic acid as an emulsifier.

2. The method of preparing an emulsion of oil which comprises mixing protalbic acid as an emulsifier with said oil and then adding the solution to be contained within said emulsifier.

In testimony whereof I have affixed my signature.

KENZO HATTORI.